United States Patent [19]
Hartmann et al.

[11] Patent Number: 5,015,915
[45] Date of Patent: May 14, 1991

[54] METHOD OF COMPENSATING FOR THE EARTH'S MAGNETIC FIELD IN A PICTURE TUBE

[75] Inventors: Uwe Hartmann; Udo Mai, both of Untergriesbach, Fed. Rep. of Germany

[73] Assignee: Deutsche Thomson-Brandt GmbH, Villingen, Fed. Rep. of Germany

[21] Appl. No.: 402,089

[22] Filed: Sep. 1, 1989

[30] Foreign Application Priority Data

Sep. 12, 1988 [DE] Fed. Rep. of Germany ....... 3830931

[51] Int. Cl.$^5$ .............................................. H04N 9/29
[52] U.S. Cl. .......................................... 315/8; 315/85; 361/150
[58] Field of Search ....................... 315/8, 85; 361/150

[56] References Cited

U.S. PATENT DOCUMENTS

| | | | |
|---|---|---|---|
| 4,262,232 | 4/1981 | Willis | 315/8 |
| 4,295,078 | 10/1981 | Wilmarth | 315/8 |
| 4,441,052 | 4/1984 | Willis | 315/8 |
| 4,489,253 | 12/1984 | Godawski | 315/8 |
| 4,760,489 | 7/1988 | Truskalo | 315/8 |

Primary Examiner—Eugene R. Laroche
Assistant Examiner—Amir Zarabian
Attorney, Agent, or Firm—Max Fogiel

[57] ABSTRACT

An arrangement for compensating against the magnetic field of the earth in a picture tube in remote-controlled video-display equipment, in which a compensating voltage is generated by a remote-control channel in the video-display equipment. This voltage is applied to a compensation coil in the picture tube. Current through the coil is adjusted in finely-divided incremental steps, and the current is continuously adjustable. The compensation voltage is applied to one end of the compensation coil, whereas the other end of the coil is supplied with substantially half of the operating voltage of the display equipment.

8 Claims, 1 Drawing Sheet

METHOD OF COMPENSATING FOR THE EARTH'S MAGNETIC FIELD IN A PICTURE TUBE

BACKGROUND OF THE INVENTION

The invention concerns a method of compensating for the earth's magnetic field in a picture tube.

Picture tubes with a large-format screen must be shielded to insulate the earth's magnetic field from the deflecting magnetic field inside the tube. Since the shielding must be extensive, it is very expensive and is accordingly never used. Circuitry that compensates for the field electrically is cheaper. Failure to eliminate the effects of the earth's field can lead to considerable qualitative sacrifices in the form of color-purity errors.

Compensating for the earth's magnetic field with a coil mounted on the tube is known. Known video-display equipment has for this purpose one or more switches on the back to establish currents of different size and direction by way of the compensation coil, which is interposed between operating voltage and ground. In series with the compensation coil is a current-limiting resistor that can to some extent be bridged by a switch that forwards one of two different current strengths through the compensation coil. Another switch, three-way and with two contact planes for example, switches the two ends of the compensation coil alternately to the series resistor and to ground in order to reverse or discontinue the current flowing through the coil.

There are, however, two serious drawbacks to circuitry of this type. First, the compensation current can be switched only between two fixed levels. Second, since the switches are located in back, it is difficult and often impossible to operate them once the device has been mounted in the wall of a cabinet.

SUMMARY OF THE INVENTION

The object of the invention is to eliminate these drawbacks.

The major advantage of the invention is that the current flowing through the compensation coil can be varied continuously and without the manual operations rendered inconvenient by the location of the switches at the rear.

BRIEF DESCRIPTION OF THE DRAWINGS

One embodiment of the invention will now be described in detail with reference to the drawing, wherein.

DESCRIPTION OF THE PREFERRED EMBODIMENTS

Figure 1:
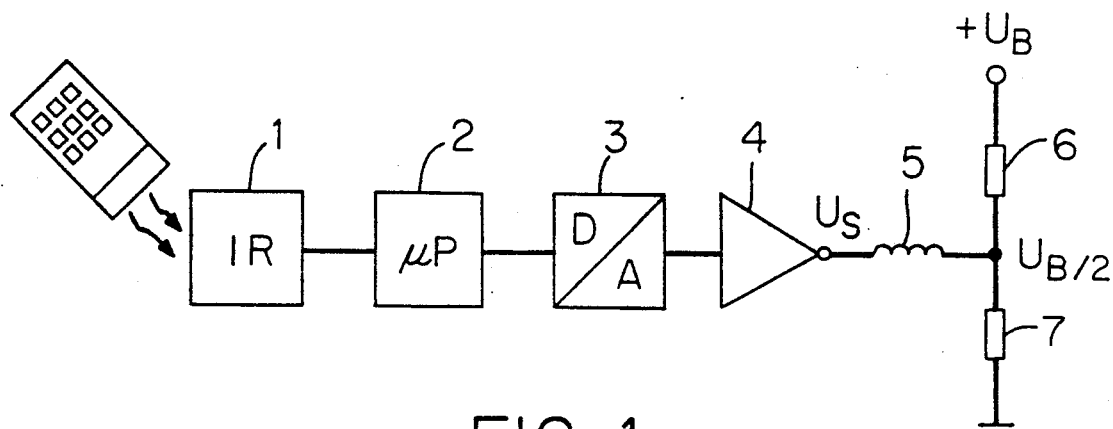
FIG. 1 illustrates how the invention operates in principle and Figure illustrates an embodiment of the invention in detail.

FIG. 1 illustrates a receiver stage 1 that amplifies remote-control signals, digitally coded infrared signals for instance, and forwards them on to a microprocessor 2. The microprocessor converts them into square-wave signals with a variable mark-to-space ratio that are forwarded to a digital-to-analog converter 3. The level of the converted analog signals varies between zero and an operating voltage $U_B$. This level travels through a power amplifier 4 to one end of a compensation coil 5, the other end of which is at a potential $U_B/2$, which equals half of operating voltage $U_B$. Potential $U_B/2$ is generated by a voltage divider 6 and 7 between operating voltage $U_B$ and ground.

How the circuit operates will now be described. No current flows through compensation coil 5 when the level at the output terminal of power amplifier 4 equals $U_B/2$. When, on the other hand, the voltage at the output terminal of power amplifier 4 is higher, a current I+ that depends on the potential difference will flow and, when the voltage is lower, a current I− that depends on the potential difference will flow through compensation coil 5.

Figure 2:
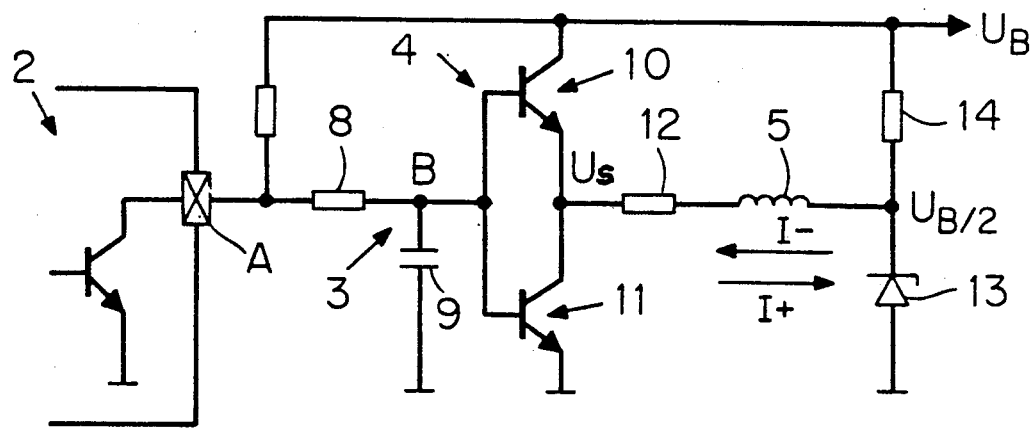

FIG. 2 illustrates how the circuitry illustrated in FIG. 1 can be embodied in practical terms.

The pulses leaving microprocessor 2 at output terminal A arrive at a stage consisting of a resistor 8 and a capacitor 9 and comprising the aforesaid digital-to-analog converter 3. The level at point B is extracted at a low impedance in the form of an adjustment voltage $U_S$ by way of power amplifier 4, which consists of transistors 10 and 11. Voltage $U_S$ arrives by way of a current-limiting resistor 12 at compensation coil 5, the other end of which is applied to a fixed direct-current voltage level $U_B/2$ by way of a Zener diode that communicates through a resistor 14 with direct-current voltage $U_B$.

We claim:

1. A method of compensating for the earth's magnetic field in a picture tube in remote-controlled video-display equipment, comprising: generating a voltage by a remote-control channel in said video-display equipment; providing a compensation coil in said picture tube; supplying said voltage to said compensation coil; and adjusting current through said compensation coil in finely-divided incremental steps, said current being continuously adjustable and further including the step of generating remote-control signals for said remote controlled video display equipment; and generating said voltage from said remote control signals by a digital to analog converter.

2. A method as defined in claim 1, including the step of generating an operating voltage for said video-display equipment; generating half of said operating voltage; supplying said half of said operating voltage to one end of said compensation coil, said voltage generated by said remote-controlled channel being applied to another end of said compensation coil.

3. A method as defined in claim 2, wherein said voltage generated by said remote-controlled channel is continuously variable between zero volts and said operating voltage.

4. An arrangement of compensating for the earth's magnetic field in a picture tube in remote-controlled video-display equipment, comprising: a remote-controlled channel in said video-display equipment for generating a voltage; a compensation coil in said picture tube; means for supplying said voltage to said compensation coil; and means for adjusting current through said compensation coil in finely-divided incremental steps, said current being continuously adjustable and further including means for generating remote-control signals for said video display equipment; and digital to analog converter means for generating said voltage from said remote-control signals.

5. An arrangement as defined in claim 4 including a source of operating voltage for said video-display equipment; means for generating half of said operating voltage in form of a stabilized direct-current voltage; means for applying said half of said operating voltage to on end of said compensation coil, said voltage generated by said remote-controlled channel being applied to another end of said compensation coil.

6. An arrangement as defined in claim 4, wherein said voltage generated by said remote-control channel is continuously variable between zero and said operating voltage.

7. An arrangement of compensation for the earth's magnetic field in a picture tube in remote-controlled video-display equipment, comprising: a receiver stage for amplifying remote-control signals for said video display equipment; a microprocessor connected to said receiver and converting said remote-control signals into square-wave signals with a variable mark-to-space ratio; a digital-to-analog converter receiving said square-wave signals and having a converted analog output signal varying between zero and an operating voltage of said video-display equipment; a power amplifier connected to said digital-to-analogy converter and receiving the converted analog signals; a compensation coil in said picture tube, said power amplifier having an output connected to one end of said compensation coil; voltage dividing means for generating half of said operating voltage and supplying said half of said operating voltage to another end of said compensation coil.

8. An arrangement as defined in claim 7, wherein said voltage dividing means has a Zener diode and resistor means connected in series with said diode for supplying a stabilized direct-current voltage to said other end of said compensation coil.

* * * * *